April 16, 1957  A. B. F. G. RICHARDSON  2,788,877
FRICTION CLUTCHES
Filed March 26, 1952  2 Sheets-Sheet 1
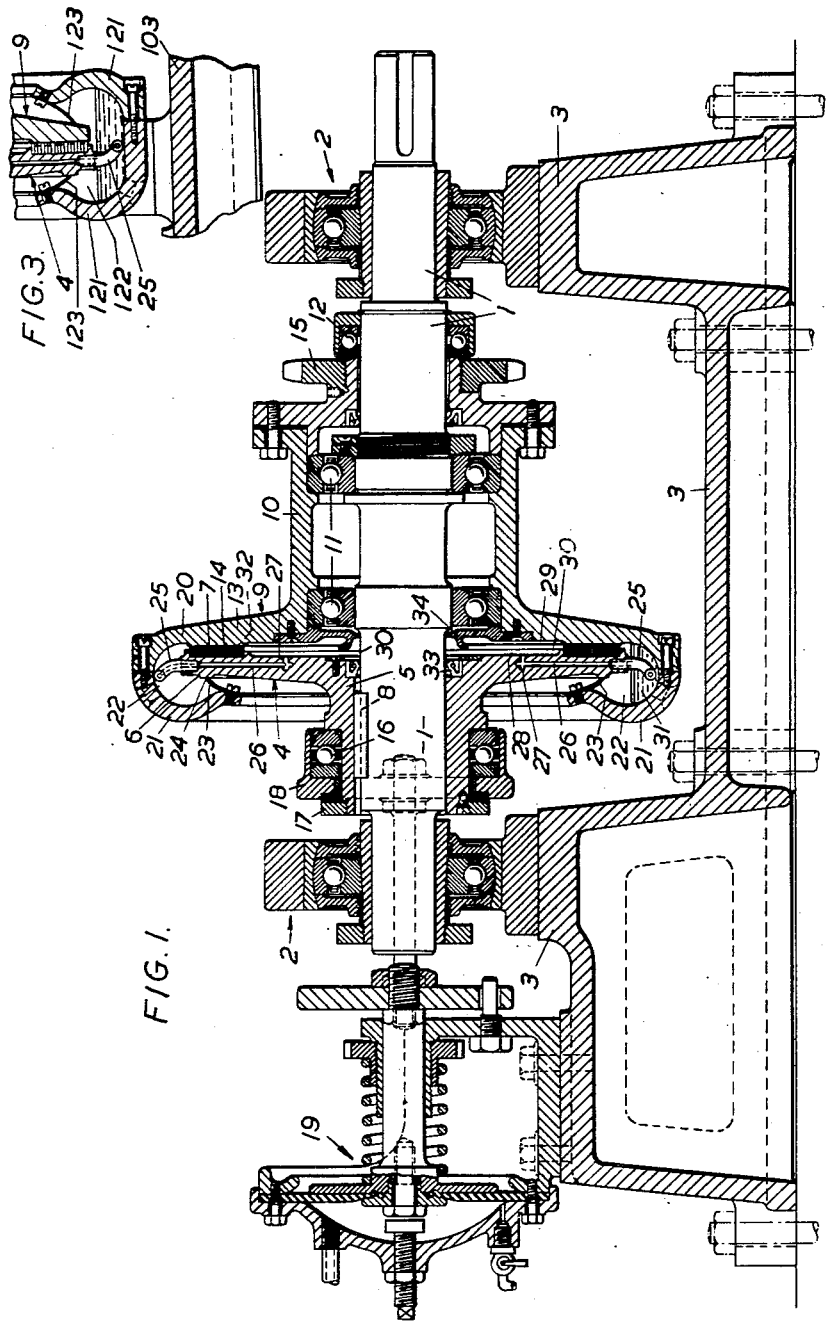
Inventor
*Arthur Bruce Fraser Gillespie Richardson*
By
Attorneys

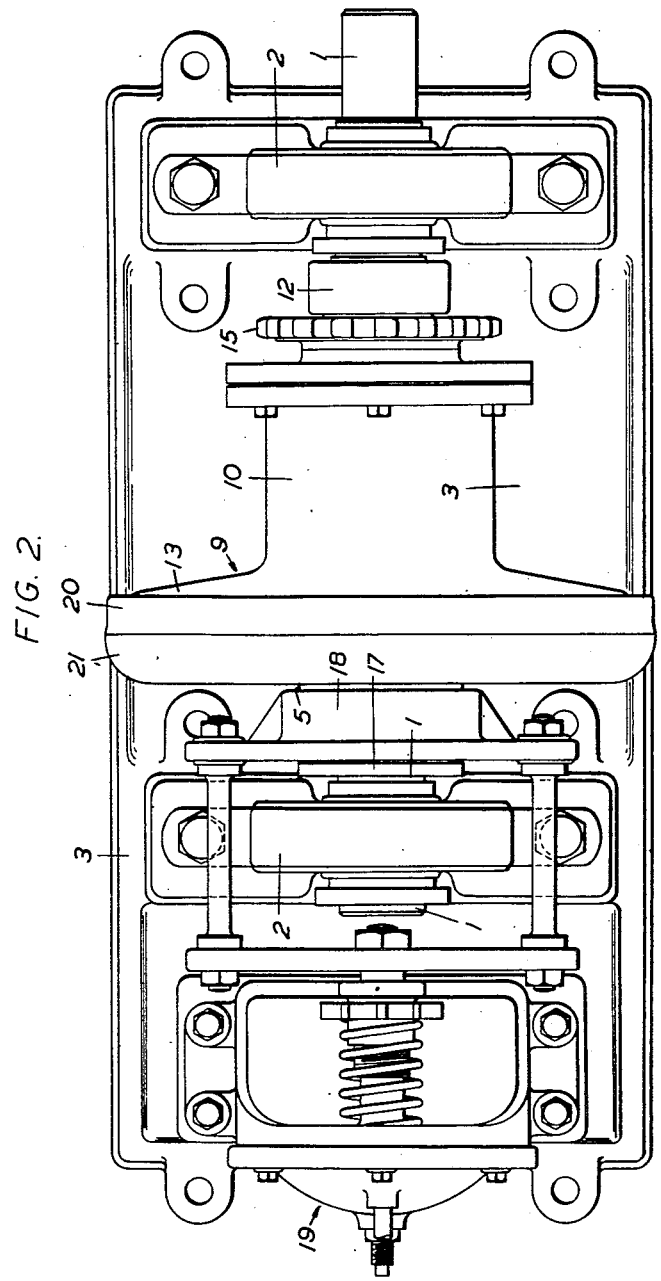

United States Patent Office 2,788,877
Patented Apr. 16, 1957

2,788,877

FRICTION CLUTCHES

Arthur Bruce Fraser Gillespie Richardson, Leigh, England, assignor to British Insulated Callender's Cables Limited, London, England, a British company Application March 26, 1952, Serial No. 278,635

Claims priority, application Great Britain April 9, 1951

11 Claims. (Cl. 192—113)

This invention relates to rotary friction clutches of the kind comprising a driving member and a driven member, one of which has an annular face adapted to be pressed into frictional driving engagement with an annular face on the other member.

Clutches of this kind may be required to operate with slip between the driving and driven members and so serve as a variable speed reduction gear. In such cases it may be advantageous and perhaps important that the response of the clutch to a given change in the pressure exerted between the faces in driving engagement (hereinafter for convenience frequently referred to as the "driving faces" of the clutch) should be as constant as possible at all times and throughout the range of speeds required of the driven member. Where it is so, it is desirable to maintain a coefficient of friction between the faces that is as uniform as possible.

With these objects in view I provide by the present invention a clutch of the kind described in which provision is made for lubricating the faces of the clutch members when in driving engagement.

In my improved form of clutch the annular driving faces are disposed between a pair of concentrically arranged chambers. The outer chamber is of toroidal form and is in communication with the external edges of the annular driving faces. The inner chamber, which may or may not be of toroidal form, is in communication with the internal edges of the annular driving faces. Means are provided for automatically transferring liquid lubricant from the outer chamber to the inner chamber from which under operating conditions it is carried by centrifugal force to and past the driving faces into the outer chamber.

For transferring lubricant from the outer to the inner chamber one of the clutch members (the driving member or the driven member) may be provided with means for scooping up liquid from the toroidal outer chamber and delivering it through appropriate channels to the inner chamber. Such member may have the form of a simple reaction wheel and operate as a reversed reaction wheel.

The toroidal outer chamber may be a stationary chamber having a circumferentially continuous opening through which the peripheral parts of the clutch member serving to scoop up liquid project into the chamber. The periphery of the other clutch member may also project through this opening. Alternatively the toroidal outer chamber may be formed by a circumferentially continuous extension on the periphery of one clutch member which curls over and round the periphery of the other clutch member which carries the means for scooping oil from the chamber and impelling it through appropriate channels to the inner chamber.

To impel liquid lubricant from the outer chamber to the inner chamber, the clutch member which rotates relative to the toroidal outer chamber (or where the outer chamber is stationary, either clutch member) may have a number of scoops projecting from its periphery into the toroidal outer chamber. Each scoop may consist of a short piece of tubing which projects first radially from the clutch member and then gradually curves until at its outer end it extends more or less in a circumferential direction with its opening facing its direction of rotation relative to the toroidal outer chamber. From its inner end ports in the wall of the clutch member lead to the inner chamber.

The inner chamber may be formed by a relatively large clearance between the adjacent surfaces of those parts of the two clutch members lying within the driving faces. Where the two clutch parts are mounted on a common support shaft the inner chamber will be of toroidal form and its inner wall may be formed by the shaft surface.

It has been indicated that the impelling arrangements may be on the driving or driven clutch member. Nevertheless where the outer chamber is formed on or carried by one of the clutch members, we prefer to provide the impelling arrangements, i. e. the scoops or their equivalents, on the driving member. This ensures that on starting up when momentarily a large slip may be expected the scoops are most effective and quickly flood the inner chamber. When normal conditions are reached very little oil will be delivered when slip is small but as slip increases so will the tendency to deliver oil to the inner chamber increase.

By way of example, two forms of my improved clutch designed for use in driving a take-up device for use with a continuous vulcanising machine for the production of rubber sheathed flexible electric cable will now be described with the aid of the accompanying drawings wherein:

Figure 1 is a sectional view of the clutch with the frictionally co-operable surfaces of the clutch members in engagement, Figure 2 is a plan of the clutch shown in section in Figure 1, and Figure 3 is a fragmental section showing a modified form of the clutch shown in Figures 1 and 2.

In the example shown in Figures 1 and 2, the clutch is supported on a shaft 1 rotatably supported at its ends in bearings 2 mounted on a bed-plate 3. The driving member 4 of the clutch comprises a hub portion 5 having at one end a flange 6 carrying an annular friction facing 7 on the face turned away from the hub. This member is constrained by a feather key 8 or the like to rotate with the shaft 1 but is permitted a limited degree of axial movement relative to it. The driven member 9 comprises a hub 10 rotatably supported on the shaft 1 by bearings 11. A thrust washer 12 prevents axial movement between the member 9 and the shaft 1. On the end of the hub 10 nearer the first member 4 is a flange 13 having an annular face 14 for frictional driving engagement with the friction facing 7 of the first member 4. To the other end of the hub is secured a chain wheel 15 or other means by which a drive can be taken from it. On the hub 5 of the axially slidable clutch member 4 is positioned a ball thrust washer 16 and between this washer and a nut or collar 17 removably secured on the outer end of the hub is a trust race 18 by which a controlled axial thrust may be applied to the slidable clutch member 4 by a diaphragm control device 19 of the kind described and claimed in the specification of copending application Serial No. 278,636, filed March 26, 1952.

The rim 20 of the flange 13 on the axially fixed driven member 9 curves outwardly and forwardly towards the driving member 4, giving the flange portion of the driven member 9 the form of a dish whose rim is approximately in the same plane as the rear face of the flange 6 of the driving member 4. A second dish 21 which is in the form of annular channel of the same external diameter and approximately of semi-circular cross-section is secured to the rim of the dished flange 20 of the driven member so that the two co-operate to form a circumferentially continuous extension on the periphery of the driven clutch member which curls over and round the periphery of the driving clutch member to form a toroidal chamber 22 with a circumferentially continuous opening in the inside wall through which the flange 6 of the driving member enters the chamber. A member 23 in the form of a spring sheet metal annulus, or a flexible moulded neoprene ring, is secured to the inner lip of the annular channel 21 and bears on the rear face 24 of the flange 6 of the driving member 4 to provide a rotary oil seal to the toroidal chamber 22.

Alternatively, as shown in Figure 3, the toroidal outer chamber may be a stationary chamber 122 formed of a pair of dish-shaped members 121, one of which is mounted on the base plate 103. Two oil seals 123 are fitted, one for the rear face of the flange of the driving member 4 and the other for the rear face of the flange of the driven member 9.

On referring again to Figures 1 and 2, it will be seen that projecting from the rim of the flange 6 of the driving member 4 at diametrically opposite points are a pair of scoops 25 in the form of bent tubes of which the open ends closely approach the peripheral wall of the toroidal chamber 22 and face the direction of rotation. From each scoop 25 a port 26 in the flange wall leads radially inwards to an axial port 27 opening into the front face 28 of the flange at a point about mid-way between the friction facing 7 and the support shaft 1. Between this inner part of the front face of the flange 6 of the driving member 4 and the neighbouring face 29 of the driven member 9 is a clearance (of the order of 1 cm.) which constitutes the inner chamber 30 of the two concentric chambers 22 and 30 between which the driving faces 7 and 14 are disposed.

The outer chamber 22 carries an appropriate supply of oil 31 which when the clutch is not in operation lies in the bottom of the chamber as shown. On starting up, oil is scooped up and delivered to the inner chamber 30 which becomes flooded and then emptied by centrifugal force as the driven member 9 works up towards the speed of the driver 4. As the driven member 9 slows down to compensate for the increase in effective diameter of the take-up reel which it drives, more oil will be delivered to the inner chamber 30 from the outer chamber 22.

Flow of oil past the driving faces 7 and 14 may be facilitated by the provision of oil channels 32 in the face of the friction facing 7 on the driving member 4. Leakage of oil between the hub 5 of the driving member 4 and its driving shaft may be reduced by the provision of a sealing ring 33 and leakage into the bearings 11 between the driven member 9 and the shaft 1 may be reduced by a deflector ring 34.

What I claim as my invention is:

1. A rotary friction clutch comprising a pair of concentrically arranged chambers, driving and driven members having frictionally co-operable annular faces disposed between said chambers, the outer of said chambers being of toroidal form and in communication with the external edges of said annular faces and the inner of said chambers being in communication with the internal edges of said annular faces and having a radial depth large in comparison with its axial length, means for pressing said annular faces into driving engagement one with another, and means provided on one of said clutch members for scooping up liquid lubricant from the outer of said chambers and delivering it through channels to the inner of said chambers from which under operating conditions it is carried by centrifugal force to and past said annular faces into the outer of said chambers.

2. A rotary friction clutch comprising driving and driven clutch members, a stationary toroidal outer chamber, frictionally co-operable annular faces on said clutch members of which the external edges communicate with said toroidal outer chamber, an inner chamber concentric with said outer chamber and in communication with the internal edges of said annular faces, means for pressing said annular faces into driving engagement with one another, means provided on the periphery of one of said clutch members and projecting into said toroidal outer chamber through a circumferentially continuous opening, for scooping up liquid lubricant from said outer chamber and impelling it through channels to said inner chamber from which under operating conditions it is carried by centrifugal force to and past said annular faces into said outer chamber.

3. A rotary friction clutch comprising driving and driven clutch members each comprising a hub portion and a flange portion, a stationary toroidal outer chamber having a circumferentially continuous opening through which peripheral parts of the flange portions of said clutch members project into said chamber, frictionally co-operable annular faces on the flange portions of said clutch members, an inner chamber in communication with the internal edges of said annular faces, means for pressing said annular faces into driving engagement with one another, and means provided on the periphery of the flange portion of one of said clutch members for scooping up liquid lubricant from said outer chamber and impelling it through channels to said inner chamber from which under operating conditions it is carried by centrifugal force to and past said annular faces into said outer chamber.

4. A rotary friction clutch comprising a rotatably mounted driving clutch member, a rotatably mounted driven clutch member provided with a toroidal outer chamber at its periphery, frictionally co-operable annular faces on said clutch members of which the radially outer edges communicate with said toroidal outer chamber, an inner chamber in communication with the radially inner edges of said annular faces, means for pressing said annular faces axially towards one another to bring them into driving engagement with one another, scoops provided on the periphery of the driving clutch member which project into said toroidal outer chamber and have open ends facing their direction of rotation, whereby liquid lubricant is scooped up from the said outer chamber and impelled through channels to the said inner chamber most effectively when slip between the two clutch members is a maximum.

5. A rotary friction clutch comprising rotatably mounted driving and driven clutch members, a circumferentially continuous extension on the periphery of one of said clutch members which curls over and round the periphery of the other of said clutch members to form a toroidal chamber having a circumferentially continuous opening, frictionally co-operable annular faces on adjacent walls of said clutch members having radially outer edges which communicate with said toroidal chamber, an inner chamber in communication with the radially inner edges of said annular faces, means for pressing said annular faces axially towards one another to bring them into driving engagement with one another, means provided on the periphery of said other of said clutch members and lying within the said toroidal chamber for scooping up liquid lubricant from said chamber and impelling it through channels to said inner chamber.

6. A rotary friction clutch comprising rotatably mounted driving and driven clutch members, a circumferentially continuous extension on the periphery of one of said clutch members which curls over and round the periphery of the other of said clutch members to form a toroidal chamber having a circumferentially continuous opening, frictionally co-operable annular faces on adjacent walls of said clutch members having radially outer edges which communicate with said toroidal chamber, an inner chamber in communication with the radially inner edges of said annular faces, means for pressing said annular faces axially towards one another to bring them into driving engagement with one another, scoops projecting from the periphery of said other of said clutch members and having open ends located within said toroidal outer chamber and facing their direction of rotation relative to said toroidal outer chamber, and in the wall of said clutch member carrying said scoops ports leading from said scoops to said inner chamber, for conveying liquid lubricant entering said scoops to said inner chamber.

7. A rotary friction clutch comprising rotatably mounted driving and driven clutch members, a circumferentially continuous extension on the periphery of one of said clutch members which curls over and round the periphery of the other of said clutch members to form a toroidal chamber having a circumferentially continuous opening, frictionally co-operable annular faces on adjacent walls of said clutch members having radially outer edges which communicate with said toroidal chamber, an inner chamber in communication with the radially inner edges of said annular faces, means for pressing said annular faces axially towards one another to bring them into driving engagement with one another, a plurality of scoops projecting from the periphery of said other of said clutch members, each scoop comprising a tube projecting first substantially radially outwards in said toroidal outer chamber and then gradually curving until at its outer end it extends in at least a substantially circumferential direction with its open end facing its direction of rotation relative to the said toroidal chamber, and in the wall of said clutch member carrying said scoops ports leading from the inner ends of said projecting tubes to said inner chamber, for conveying liquid lubricant entering said scoops to said inner chamber.

8. A rotary friction clutch comprising rotatably mounted driving and driven clutch members, a toroidal outer chamber, frictionally co-operable annular faces on said clutch members of which the radially outer edges communicate with the interior of said toroidal outer chamber, an inner chamber concentric with said outer chamber and in communication with the radially inner edges of said annular faces, means for pressing said annular faces axially towards one another to bring them into driving engagement with one another, means provided on the periphery of one of said clutch members and projecting into said toroidal outer chamber through a circumferentially continuous opening, for scooping up liquid lubricant from said outer chamber and impelling it through channels to said inner chamber from which under operating conditions it is carried by centrifugal force to and past said annular faces into said outer chamber.

9. A rotary friction clutch comprising driving and driven clutch members each comprising a hub portion and a flange portion, a toroidal outer chamber having a circumferentially continuous opening through which peripheral parts of the flange portions of said clutch members project into said chamber, frictionally co-operable annular faces on the flange portions of said clutch members, an inner chamber in communication with the internal edges of said annular faces, means for pressing said annular faces into driving engagement with one another, and means provided on the periphery of the flange portion of one of said clutch members for scooping up liquid lubricant from said outer chamber and impelling it through channels to said inner chamber from which under operating conditions it is carried by centrifugal force to and past said annular faces into said outer chamber.

10. A rotary friction clutch comprising a pair of concentrically arranged chambers, driving and driven clutch members having frictionally co-operable annular faces disposed between said chambers, the outer of said chambers being of toroidal form and in communication with the external edges of said annular faces and the inner of said chambers being in communication with the internal edges of said annular faces, means for pressing said annular faces into driving engagement one with another, scoops projecting from the periphery of one of said clutch members that is rotatable relative to said toroidal chamber, said scoops having open ends located within said toroidal outer chamber and facing their direction of rotation relative to said toroidal outer chamber, and in the wall of said member carrying said scoops ports leading from said scoops to said inner chamber, for conveying liquid lubricant entering said scoops to said inner chamber.

11. A rotary friction clutch comprising a pair of concentrically arranged chambers, driving and driven clutch members having frictionally co-operable annular faces disposed between said chambers, the outer of said chambers being of toroidal form and in communication with the external edges of said annular faces and the inner of said chambers being in communication with the internal edges of said annular faces, means for pressing said annular faces into driving engagement one with another, a plurality of scoops projecting from the periphery of one of said clutch members that is rotatable relative to said toroidal chamber, each of said scoops comprising a tube projecting first substantially radially outwards in said toroidal outer chamber and then gradually curving until at its outer end it extends in at least a substantially circumferential direction with its open end facing its direction of rotation relative to the said toroidal chamber, and in the wall of said clutch member carrying said scoops ports leading from the inner ends of said projecting tubes to said inner chamber, for conveying liquid lubricant entering said scoops to said inner chamber.

References Cited in the file of this patent

UNITED STATES PATENTS

| | | |
|---|---|---|
| 561,028 | Perry | May 26, 1896 |
| 817,180 | Metten | Apr. 10, 1906 |
| 1,059,395 | Rowell | Apr. 22, 1913 |
| 1,333,440 | Ollard | Mar. 9, 1920 |
| 1,437,595 | Kimble | Dec. 5, 1922 |
| 1,859,280 | Corbin | May 24, 1932 |
| 2,054,377 | Havill et al. | Sept. 15, 1936 |
| 2,713,927 | Rabinow | July 26, 1955 |

FOREIGN PATENTS

| | | |
|---|---|---|
| 374,012 | France | June 3, 1907 |
| 894,029 | France | Dec. 12, 1944 |
| 291,382 | Germany | July 23, 1914 |